UNITED STATES PATENT OFFICE.

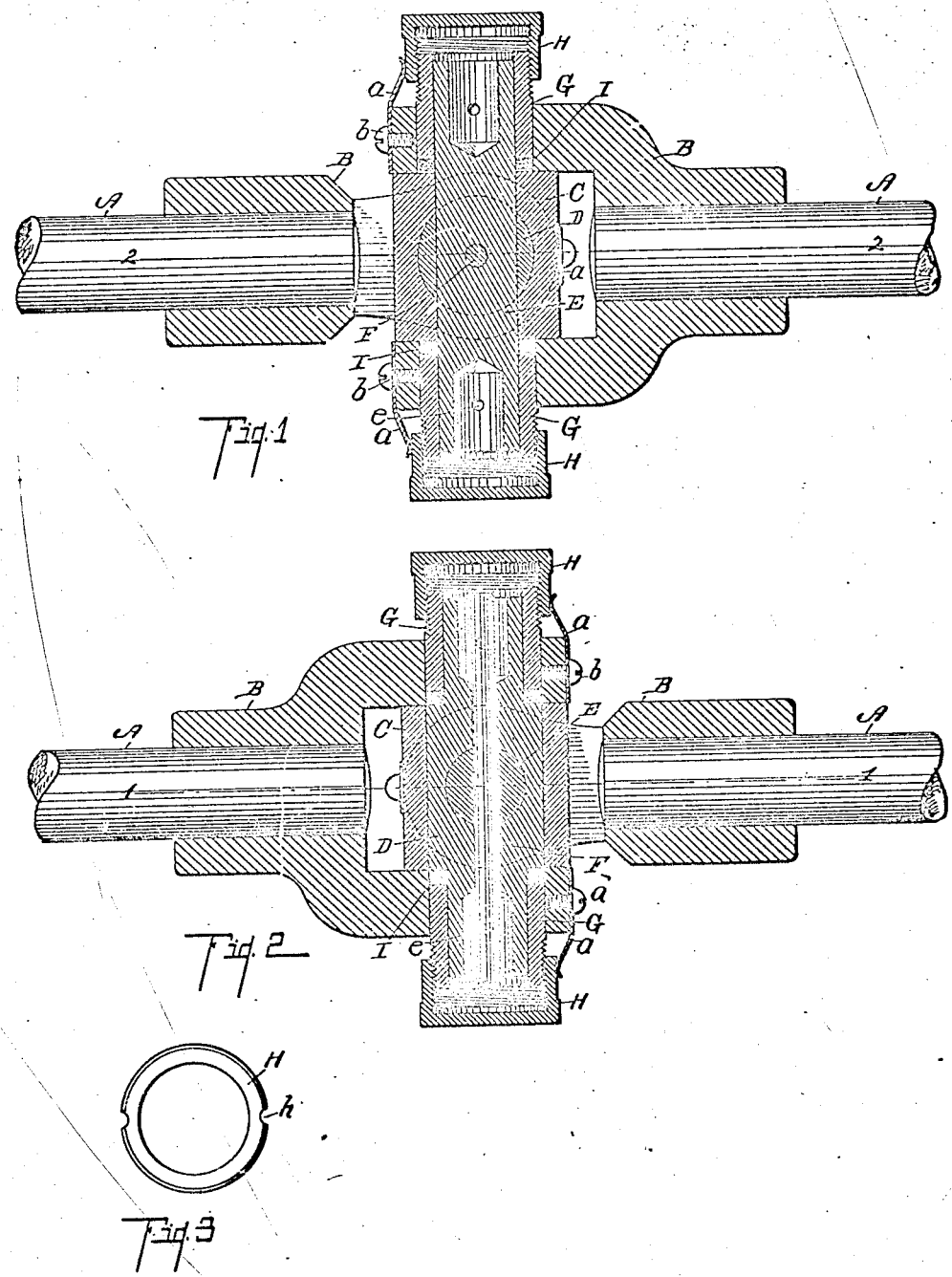

MAURICE E. BLOOD, OF KALAMAZOO, MICHIGAN.

UNIVERSAL JOINT.

No. 895,149.  Specification of Letters Patent.  Patented Aug. 4, 1908.

Application filed May 17, 1905. Serial No. 260,836.

*To all whom it may concern:*

Be it known that I, MAURICE E. BLOOD, a citizen of the United States, residing at Kalamazoo, in the county of Kalamazoo and State of Michigan, have invented certain new and useful Improvements in Universal Joints, of which the following is a specification.

My invention has for its object a universal joint simple in construction, easily taken apart or put together, and one with large bearing surfaces that will retain the lubricant in the best manner and prevent the dust and dirt from getting in the bearings. I attain these objects by the device illustrated in the accompanying drawings, in which—

Figure 1 is a longitudinal sectional view on line 1—1 of Fig. 2. Fig. 2 is a longitudinal sectional view on line 2—2 of Fig. 1, and Fig. 3 an end or top view of one of the grease-cups. Both Fig. 1 and Fig. 2 show the ends of two shafts that the joint couples together to enable one to rotate the other at varying angles to each other.

Similar letters refer to similar parts throughout the several views.

A A designate the ends of two shafts which are connected together by the universal joint.

B B' are Y-shaped forks having shanks suitable for receiving the shafts. The arms of each fork are provided with holes or perforations at right angles to the shaft to receive the bushings G which are forced into them.

C is the center-block which is preferably made a cube, although it can be formed in any other suitable shape to have four of its surfaces at right angles to each other opposing the four inner surfaces of the fork arms. This center-block is provided with two holes that intersect each other at right angles and come in the proper position to register with the holes in the four bushings G. One of these holes is substantially the same size as the holes in the bushings, and is made to receive the straight pin E which passes freely through two opposed bushings, the center-block and a crosswise hole in the enlarged portion of the shouldered pin D. The other hole is made enough larger than this to receive the enlarged portion of the pin D which enlarged portion must be large enough to have a hole crosswise through it that will receive the pin E but not so large but what it will pass through the holes in the ends of the forks before the bushings are put in. The shouldered pin D is also provided with a small longitudinal hole to receive the locking pin F, and this pin F also passes through a hole made crosswise through the center of the straight pin E. The pins E and D also have holes countersunk or bored for a short distance in each end to receive the lubricating oil or grease which passes through the small crosswise holes e to the bearings in the bushings. The bushings G are not forced quite through the holes in the fork ends but enough room is left within this hole to receive the felt washers I. The portions of the bushings that project outside the forks are threaded to receive the grease-cups H. Washers I, which can be made of felt or other suitable material, are to prevent the lubricant from coming out or the dust from getting in the bearings. Each keeper-spring *a* has one end secured to the arm of the fork by means of the screw *b* while the other end bears against the grease-cup H to prevent it from unscrewing but it does not prevent turning the grease-cup by hand. The grooves *h* on the side of the grease-cups are for the keeper-springs to drop into to further increase the efficiency of the keeper-springs to prevent the grease-cups from working off.

In assembling the parts the center-block C is placed between the arms of one of the forks with the large hole opposing the holes in the arms. The felt washers I are then put on both ends of the shouldered pin D against the shoulder and this pin then pushed through the holes in the arms and the center-block. The bushings G are then forced in the holes in the arms of this fork until they come in contact with the felt washers. It will be seen that one of these bushings might have been put in before the pin D is put in. The other two bushings and felt washers should then be put in the holes in the arms of the other fork and this fork placed in position on the center-block. There will then be a straight hole through the bushings in the arms of this last fork, the felt washers, the center-block and crosswise through the shouldered pin D to receive the straight pin E. The pin E can then be put in place in this hole and it will be seen that it will lock the shouldered pin D from either endwise or rotary movements. The small locking pin F can then be put in the longitudinal hole through the shouldered pin D and passing through the crosswise hole in the center of the pin E locks the pin E to prevent it from having endwise or rotary movements. The locking pin F is prevented from coming out by means of the grease-cups which are afterwards put on the bushings.

In order to take the joint apart all that is necessary to do is to take off the grease-cups push out the locking pin F and then the pin E. When using grease the grease-cups may be screwed on far enough to insure them from coming off and at intervals during use turned up a little at a time in the common way of using grease-cups. The bushings G G G G which form the working bearings for the pins D and E are of ample size to insure strength and durability. They are interchangeable and may be of hardened steel which is less liable to wear. The portions projecting beyond the faces of the fork arm provide for longer bearings and also parts to be threaded to receive the grease-cups. It will be evident that the bushings might be made integral projecting parts of the forks, and the pin D made, its full length, the size of its larger part, but I prefer the construction shown, as in that manner the bushings and forks can be made the same size and interchangeable, and the bushings replaced if worn. It will also be seen that the bearings of the pins D and E could be well lubricated without any holes in their ends as the grease-cups would hold the oil or grease which would work around the ends of the pins into the bearings.

I am aware that universal joints have been made where the cross was formed by one pin passing through a hole crosswise in the other and also having a center-block, and I do not claim these features broadly. I also wish to have it understood that my invention could be modified to use a cross where one of the pins passed at the side of the other instead of in a hole through the other.

The block C can be omitted, but of course is of advantage in strengthening and centering the parts.

Having thus described my invention, what I claim as new and desire to secure by Letters Patent, is—

1. In a universal joint, the two forks adapted to be secured to the ends of two shafts, the arms of said forks being perforated at right angles to the shafts; bushings for said arms; a cross formed by two pins, one passing through a hole crosswise through the other, the outer ends of said pins being journaled in said bushings in the forks, said bushings each having a threaded portion projecting beyond the face of the forks; and a grease cup, screw-threaded to fit each of said bushings, substantially as shown.

2. In combination with two shafts, two forks adapted to be connected to the ends of the shafts; a coupling cross; bearings on said forks for the arms of said cross; and grease cups arranged to embrace the ends of the arms of said cross adapted to be adjusted to feed the lubricant to the bearings.

3. In a universal joint, the combination of the fork members perforated at right angles to their shafts and containing journal bearings provided with outwardly - projecting portions adapted to receive grease-cups; a cross for coupling said forks; and grease-cups adapted to cap over the said projecting portions and to be adjusted to feed lubricant to the bearings, substantially as shown.

4. In a universal joint, the combination of the fork members perforated at right-angles to their shafts; bearing bushings secured in said perforations, the outer ends of said bushings being each adapted to receive a grease cup; a cross for coupling said parts together; and grease cups which cap over said outer ends of the bushings, substantially as shown.

5. In a universal joint, the combination of the fork members, perforated at right angles to their shafts; a cross for coupling said forks together; outwardly projecting threaded portions on the arms of said forks; grease cups threaded on the said projecting portions and adapted to be adjusted to feed the lubricant to the bearings; and spring keepers adapted to bear against the grease cups to prevent them from unscrewing, substantially as shown.

6. In a universal joint, the combination of the fork members perforated at right angles to their shafts; bushings secured in said perforations, forming journal bearings; a cross for coupling the forks together; grease cups for capping over the outer ends of said bushings; and washers opposed to the inner ends of said bushings, substantially as and for the purposes shown.

7. In a universal joint, the combination of the fork members perforated at right angles to their shafts; a cross comprising a center block perforated in the form of a cross with holes of unequal size; two pins corresponding in size to the holes through the center-block, the larger pin being locked in place in the center-block by means of the smaller pin; and a locking pin arranged longitudinally through the larger pin and crosswise through the smaller pin, substantially as shown.

In testimony whereof I have hereunto signed my name to this specification in the presence of two subscribing witnesses.

MAURICE E. BLOOD.

Witnesses:
HOWARD E. BLOOD,
CLARENCE C. BLOOD.